(12) United States Patent
Anderson et al.

(10) Patent No.: US 7,187,829 B2
(45) Date of Patent: Mar. 6, 2007

(54) LOW SMOKE, LOW TOXICITY FIBER OPTIC CABLE

(75) Inventors: Mark A. Anderson, Holyoke, MA (US); Jeffrey S. Doak, Greenfield, MA (US); George Gong, Rindge, NH (US); Young Joon Kim, Greenfield, MA (US); Jun Hong Yi, Greenfield, MA (US)

(73) Assignee: Judd Wire, Inc., Turners Falls, MA (US)

( * ) Notice: Subject to any disclaimer, the term of this patent is extended or adjusted under 35 U.S.C. 154(b) by 190 days.

(21) Appl. No.: 10/775,585

(22) Filed: Feb. 10, 2004

(65) Prior Publication Data

US 2004/0190841 A1 Sep. 30, 2004

Related U.S. Application Data

(63) Continuation-in-part of application No. 10/694,656, filed on Oct. 27, 2003, now Pat. No. 6,898,354.

(60) Provisional application No. 60/421,665, filed on Oct. 28, 2002.

(51) Int. Cl.
*G02B 6/44* (2006.01)

(52) U.S. Cl. ............... 385/100; 385/126; 385/128; 385/113

(58) Field of Classification Search ........ 385/100–113, 385/123–128

See application file for complete search history.

(56) References Cited

U.S. PATENT DOCUMENTS

| | | | |
|---|---|---|---|
| 5,002,359 A | 3/1991 | Sayegh | |
| 5,436,994 A | 7/1995 | Ott et al. | |
| 5,615,293 A | 3/1997 | Sayegh | |
| 6,074,100 A | 6/2000 | Rowland et al. | |
| 6,102,581 A | 8/2000 | Deveau et al. | |
| 6,151,433 A | 11/2000 | Dower et al. | |
| 6,352,372 B1 | 3/2002 | Shahid | |
| 6,453,097 B1 * | 9/2002 | Newton et al. | ............. 385/102 |
| 6,492,453 B1 | 12/2002 | Ebrahimian et al. | |
| 6,527,458 B2 | 3/2003 | Kim | |
| 6,623,172 B1 | 9/2003 | de Jong et al. | |
| 6,648,520 B2 | 11/2003 | McDonald et al. | |
| 6,652,155 B2 | 11/2003 | Lampert | |
| 2002/0058736 A1 | 5/2002 | Zolotnitsky et al. | |

FOREIGN PATENT DOCUMENTS

| | | |
|---|---|---|
| EP | 1 076 253 A2 | 2/2001 |
| EP | 1 094 347 A | 4/2001 |
| JP | 07 041629 A | 2/1995 |
| WO | WO 98/05493 A | 2/1998 |

* cited by examiner

*Primary Examiner*—Kevin S. Wood
(74) *Attorney, Agent, or Firm*—Holland & Bonzagni, P.C.; Mary R. Bonzagni, Esq.

(57) ABSTRACT

A low smoke, low toxicity fiber optic cable that provides an intermediate surface that facilitates bonding to optical connectors such as LC connectors, is provided. In a preferred embodiment, the inventive cable exhibits improved dimensional stability by minimizing or eliminating shrinkage stress on the optic fiber core.

22 Claims, 3 Drawing Sheets

LOW SMOKE, LOW TOXICITY FIBER OPTIC CABLE

RELATED APPLICATION

This application is a continuation in part of U.S. patent application Ser. No. 10/694,656, filed Oct. 27, 2003 now U.S. Pat. No. 6,898,354, which claims priority from U.S. Provisional Patent Application Ser. No. 60/421,665, filed Oct. 28, 2002.

TECHNICAL FIELD OF THE INVENTION

The present invention generally relates to fiber optic cables, and more particularly relates to a low smoke, low toxicity fiber optic cable that facilitates bonding to optical connectors such as LC connectors.

BACKGROUND ART

Fiber optic cables are currently being used throughout the aerospace and communications industries. These cables are typically employed in computerized equipment and communications applications where space and/or weight restrictions make traditional copper wiring systems inappropriate. Optical fiber, as a data transfer means, is known for its exceptional speed and bandwidth capability and for its ability to provide reliable communication signals.

The commercial and military aerospace industry is a harsh testing ground for fiber optic cables, requiring flawless performance in extremely demanding physical environments. In such environments, where even minor failures can result in loss of life and property, fiber optic cables are subjected to conditions which include destructive extremes in vibration, shock, temperature, pressure, water/chemical emersion, as well as, electromagnetic and radio frequency interference. It is for these reasons that aerospace standards for the manufacture and supply of fiber optic cables are some of the most rigorous found in any industry.

The Boeing Company ("Boeing"), as an aircraft manufacturer serving a worldwide market, maintains fiber optic cable standards for, among other things, smoke and toxic gas emissions, cable jacket shrinkage and finished cable attenuation.

Test methods detailed in Section 7.46 of Boeing Standard BSS-7324 entitled "Procedure for Testing Electrical Wire and Cable", dated Aug. 18, 1998 ("Boeing BSS-7324"), which are incorporated herein by reference, relate to smoke emission and toxicity. Pursuant to these tests, a fiber optic cable sample (3.05 meter sample) is burned for four minutes in a burn chamber under both flaming and non-flaming conditions. To meet the smoke emission standard, the specific optical density ($D_s$) of the resulting smoke must be less than 50. To meet the toxicity requirements for smoke gases, the following six gases must not be present in the smoke contained in the chamber in quantities at or above the quantities listed below:

|  | parts per million (ppm) |
| --- | --- |
| Carbon Monoxide (CO) | 3500 |
| Hydrogen Cyanide (HCN) | 150 |
| Hydrogen Fluoride (HF) | 200 |
| Hydrogen Chloride (HCl) | 500 |
| Sulfur Dioxide ($SO_2 + H_2S$) | 100 |
| Nitrous Gases ($NO + NO_2$) | 100 |

Test methods detailed in Section 8.1.1 of Boeing Standard BMS-71 entitled "Draft BMS 13-71 Cable, Fiber Optic", dated Mar. 23, 2002 ("Boeing BMS 13-71"), in Judd Wire, Inc.'s Standard Operating Procedure (SOP) Number 90111, entitled "Shrinkage Measurement Method", publication date—Oct. 29, 2003 ("Judd SOP 90111"), and in Electronic Industries Association (EIA)/Telecommunications Industry Association (TIA) Test Procedure Number 455-3A, dated May 23, 1989 ("EIA/TIA Test Procedure Number 455-3A"), which are all incorporated herein by reference, relate to cable jacket shrinkage and optical attenuation stability in the finished cable. Pursuant to the above-referenced tests, a fiber optic cable is exposed to a temperature cycling regimen using a dynamic mechanical analyzer (DMA) with zero load and the degree of jacket shrinkage, as well as, the stability of optical attenuation in the cable measured. To meet the standards, the degree of cable jacket shrinkage must not exceed a 45 millimeter (mm) (1.3%) maximum change, while the finished cable attenuation for fiber optic cables employing one or more 62.5/125 µm graded-index, multimode optical fibers must not exceed 3.5 decibels per kilometer (dB/km) at 850 nanometers (nm), and 2.0 dB/km at 1300 nm.

In addition to recognized aerospace standards for the manufacture and supply of fiber optic cables, it is noted that the aerospace industry, in its quest for new designs and materials that can deliver stronger, lighter and more durable fiber optic cables, has recently placed a strong emphasis on small form factor optical connectors such as LC connectors, which are available from Lucent Technologies, Inc. The LC connector employs a ceramic ferrule having a diameter that is only 1.25 millimeters. The use of LC connectors requires bonding of the fiber optic cable to the inside of the ferrule. Unfortunately, of the limited number of materials likely to meet the smoke and toxic gas generation standards detailed above (i.e., fluoropolymers and polyimides), fluoropolymers, especially as they approach the perfluorinated state, are extremely difficult to effectively bond to any surface.

Prior art attempts to satisfy the rigorous aerospace fiber optic cable standards, as well as, address the optical connector interfacing challenges, which are noted above, include a ruggedized fiber optic cable described in U.S. Pat. No. 6,233,384 B1 to Sowell, III et al. The ruggedized fiber optic cable is prepared by applying a fluoropolymer first jacketing material over a buffered optic fiber core. A rigid, closely-spaced, spirally or helically wrapped wire layer is then applied over the fluoropolymer first jacketing layer, followed by the application of a mechanical braid (e.g., plastic fibers or strands) over the wire layer. To protect the fiber optic cable from the environment, an outer jacket (e.g., a tetrafluoroethylene/(perfluoroalkyl) vinyl ether copolymer) is applied over the mechanical braid. Although this cable design provides some protection for the optic fiber core, the outer jacket will shrink in the axial direction during cable manufacture and use, thereby increasing stress on the optic fiber core, which can cause the fibers to crack or break. In addition, bonding this cable to LC connectors would be difficult where the fluoropolymers used to form the first jacketing material include perfluorinated polymers (e.g., PTFE) which, as noted above, are extremely difficult to effectively bond to any surface. Further, it is noted that the use of steel and other metallic wires in this cable design results in a substantial increase in weight, which is objectionable in aerospace applications.

U.S. Pat. No. 5,615,293 to Sayegh discloses a fiber optic cable assembly that employs acrylic coated optical fibers surrounded by a buffer material such as foamed fluorinated ethylene-propylene (FEP). The acrylic coating material on the optical fibers, however, has a use temperature ranging from about −65° C. to about 125° C. and will degrade when the FEP buffer material, which must be melt-processed at a temperature exceeding 300° C., is extruded onto the fibers, thereby causing undesirable yellowing and even loss of integrity of the coating material. In addition, of the embodiments described in this reference, many would fail to satisfy the rigid smoke and toxic gas emission standards noted herein while others would not bond effectively to optical connectors.

Accordingly, it is a general object of the present invention to avoid the above-referenced disadvantages of the prior art.

More particularly, it is an object of the present invention to provide a fiber optic cable that provides an intermediate surface that facilitates bonding to optical connectors such as LC connectors.

It is yet a more particular object to provide a low smoke, low toxicity fiber optic cable that facilitates bonding to optical connectors and that exhibits improved dimensional stability by minimizing or eliminating shrinkage stress on the optic fiber core, thereby demonstrating more stable signal carrying characteristics in extremely demanding physical environments.

SUMMARY

The present invention therefore provides a fiber optic cable assembly, which comprises:
(1) a fiber optic cable comprising at least one optical fiber, a primary buffer member circumferentially surrounding each optical fiber, and a secondary buffer member circumferentially surrounding the primary buffer member, wherein the secondary buffer member is prepared from, or has an outer surface or layer prepared from, a bondable polyimide or fluoropolymer;
(2) a connector adapted to receive the fiber optic cable; and
(3) an adhesive which serves to bond the bondable polyimide or fluoropolymer of the secondary buffer member to the connector to form a unitary structure,
wherein, when tested in accordance with Method Number 2009-1 (Termini Retention Test) of SAE-AS-13441 (Test Methods for Electrical Connectors), dated January 1998, the fiber optic cable assembly exhibits a bond strength of at least about 2 Newtons per centimeter (N/cm) in the adhesive coated area(s) thereof.

The present invention further provides a low smoke, low toxicity fiber optic cable that comprises:
(1) at least one optical fiber;
(2) a primary buffer member circumferentially surrounding each optical fiber;
(3) a secondary buffer member circumferentially surrounding the primary buffer member, wherein the secondary buffer member is prepared from, or has an outer surface or layer prepared from, a bondable polyimide or fluoropolymer;
(4) a strength member circumferentially surrounding the secondary buffer member; and
(5) an outer jacket circumferentially surrounding the strength member,
wherein, when tested in accordance with Boeing Specification Support Standard BSS 7324 (dated Dec. 2, 1998) Smoke Emission Test Method, the cable produces, at four minutes in the flaming mode, a smoke with a specific optical density of less than 100.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which.

BEST MODE FOR CARRYING OUT THE INVENTION

The fiber optic cable of the present invention demonstrates a combination of properties not found in conventional fiber optic cables. This unique combination of desirable properties makes the inventive cables extremely valuable in applications such as aircraft, missiles, satellites, etc. More specifically, the inventive cable exhibits low smoke and toxic gas emissions and facilitates bonding to optical connectors such as LC connectors. In a preferred embodiment, the inventive cable further exhibits improved dimensional stability in the form of reduced material shrinkage (especially reduced secondary buffer and jacket shrinkage in the axial direction) and thus reduced optical attenuation in the cable throughout a wide temperature range of from −65° C. to 135° C.

The term "low toxicity", as used herein, is intended to mean that when tested in accordance with Boeing BSS-7324, the cable satisfies the toxicity requirements noted therein and in paragraph [0006] hereinabove.

Although the inventive fiber optic cable was developed primarily for use in aerospace applications, its application is not so limited. In fact, the inventive cable may also be used in, for example, automotive, vehicular, shipboard and industrial applications.

Figure 1:
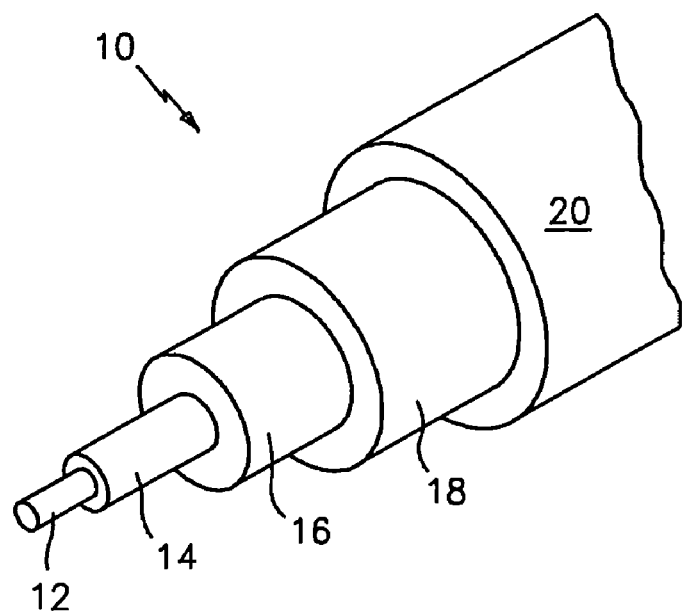
FIG. 1 is a partial side perspective view of the fiber optic cable of the present invention.

Referring now to FIG. 1 in detail, reference numeral 10 has been used to generally designate the fiber optic cable of the present invention. Fiber optic cable 10 basically comprises:
(1) at least one optical fiber 12;
(2) a primary buffer member 14 circumferentially surrounding each optical fiber 12;
(3) a secondary buffer member 16 circumferentially surrounding the primary buffer member 14;
(4) a strength member 18 circumferentially surrounding the secondary buffer member 16; and
(5) an outer protective jacket 20 circumferentially surrounding the strength member 18.

Optical fibers suitable for use in the present invention are not limited and include glass fibers and plastic-clad fibers. Such fibers may take the form of single-mode fibers or multi-mode fibers, with multi-mode fibers being further divided into step-index, multi-mode fibers and graded-index, multi-mode fibers.

A "mode" is defined as a transverse pattern of energy that propagates through an optical fiber at a specific velocity. As the names suggest, single-mode fibers only support a single mode, while multi-mode fibers support a number of modes.

For step-index, multi-mode fibers, the index of refraction (i.e., the ability of a material to bend light) is the same across the entire radius of the fiber core, but sharply decreases at the core/cladding interface. In the case of graded-index, multi-mode fibers, the index of refraction gradually changes across the radius of the core from a maximum at the center to a minimum near the edges.

In one preferred embodiment, optical fiber 12 is a single-mode optical fiber having a core diameter of approximately 9 micrometers (μm) and a cladding diameter of approximately 125 μm.

In another preferred embodiment, optical fiber 12 is a step-index, multi-mode fiber having either a core diameter of approximately 100 μm and a cladding diameter of approximately 140 μm, or a core diameter of approximately 200 μm and a cladding diameter of approximately 240 μm.

In yet another preferred embodiment, optical fiber 12 is a graded-index, multi-mode optical fiber having a core diameter of either approximately 50 μm or approximately 62.5 μm and a cladding diameter of approximately 125 μm.

The primary buffer member 14, which is tightly bonded to each optical fiber 12, provides the first layer of mechanical protection to fiber(s) 12 by cushioning and protecting the fiber(s) when the fiber(s) is bent, cabled, or spooled. As is well known to those skilled in the art, stresses placed upon optical fibers during handling may induce microbending of the fibers, resulting in attenuation of the light, which is intended to pass through them, and thus inefficient signal transmission.

Materials suitable for use in preparing primary buffer member 14 include, but are not limited to, silicones, acrylic polymers, acrylates and polyimides.

For example, primary buffer member 14 may be prepared using acrylate functional monomers and/or oligomers in the form of a polymer coating that is applied to the fiber from a melt or a solution of the polymer, or is extruded onto the fiber. Such buffered fibers have a use temperature ranging from about 85° C. to about 125° C. and can degrade when exposed to temperatures that exceed the upper end of this range during cable manufacture and use, causing undesirable yellowing and even loss of integrity of the coating material.

In a preferred embodiment, optical fiber(s) 12 is a graded-index, multi-mode optical fiber that is buffered with acrylate functional monomers and/or oligomers. Such buffered fibers are available from Corning, Inc., 1 Riverfront Plaza, Corning, N.Y. 14831-0001 ("Corning"), OFS Fitel Denmark I/S, Priorparken 680, DK-2605 Brndby, Denmark ("OFS Fitel"), and Nufern, Inc., 7 Airport Park Road, East Granby, Conn. 06026-9523 ("Nufern"). Corning and OFS Fitel sell these buffered fibers under the trade designations INFINICOR buffered fibers and GIGAGUIDE buffered fibers, respectively.

Primary buffer member 14 may also be prepared using polyimides. Polyimide buffered optical fibers have a use temperature ranging from about 150° C. to about 250° C. and thus do not degrade during normal cable manufacture and/or use.

In another preferred embodiment, optical fiber(s) 12 is a graded-index, multi-mode optical fiber that is buffered with a heat-resistant polyimide. Such buffered fibers are available from OFS Fitel.

In yet another preferred embodiment, optical fiber(s) 12 is a radiation hardened, graded-index, multi-mode optical fiber that is buffered with a polyimide. Such fibers, which are resistant to gamma (γ)-radiation, are available from Nufern.

When a plurality of coated or buffered optical fibers are used, it is preferred that such fibers take the form of an optical fiber assembly (e.g., ribbon assemblies, cables) to simplify construction and to eliminate the need to handle individual fibers. The fibers in such assemblies are bonded together in a matrix material (e.g., polyester resin), which either encases the fibers or edge-bonds the fibers together. Optical fiber assemblies, comprising single-mode ribbon cables, are available from Sumitomo Electric Lightwave Corp., Sumitomo Electric, 78 TW Alexander Drive, Research Triangle PA, N.C. 27709 ("Sumitomo Lightwave"), under the product designation LITEPIPE ribbon cables.

The secondary buffer member 16 offers added mechanical protection to optical fiber 12 and exhibits low axial shrinkage, while providing an outer surface that can be effectively bonded to ceramic ferrules used in LC connectors by way of conventional epoxy adhesives. Suitable epoxy adhesives include thermosetting epoxy adhesives that have a glass transition temperature ($T_g$) of greater than the maximum temperature anticipated in the operating environment of the cable. The term "low axial shrinkage," as used herein, is intended to mean an axial shrinkage of less than or equal to 0.5%.

The secondary buffer member 16 is preferably held tightly against (but not bound to) primary buffer layer 14.

In one embodiment, secondary buffer member 16 is made up of a single layer that is prepared from a bondable fluoropolymer. As noted above, it is extremely difficult to bond to the surface of fluoropolymers, especially those fluoropolymers approaching the perfluorinated state. By way of the present invention, a certain class of grafted or modified fluoropolymers has been discovered that can be effectively bonded to conventional epoxy adhesives. Examples of bondable fluoropolymers that fall within this class are maleic anhydride grafted ethylene-tetrafluoroethylene (ETFE) copolymers, which are sold by E. I. du Pont de Nemours and Company, 1007 Market Street, Wilmington, Del. 19898 ("Dupont") under the trade designations TEFZEL 2202 and TEFZEL 2203 synthetic resinous fluorine-containing polymers.

In another embodiment, which is especially suitable for use with acrylate coated optical fibers, secondary buffer member 16 is made up of two layers. A first or inner layer is prepared from one or more fluoropolymers that can be melt-processed at temperatures of less than about 200° C.(preferably, from about 160° C. to about 180° C.), and that can offer an upper use temperature of greater than about 80° C. (preferably, from about 80° C. to about 135° C). A second or outer layer is prepared from either one or more bondable fluoropolymers, which are described above, or from one or more bondable polyimides. The two layer system avoids exposure of the acrylate coated optical fibers to degrading temperatures during cable manufacture, while providing the benefit of a bondable outer layer.

Examples of fluoropolymers that can be melt-processed at temperatures of less than about 200° C. and that offer suitable upper use temperatures include polyvinylidene fluoride (PVDF), PVDF copolymers and terpolymers, copolymers and terpolymers of chlorotrifluoroethylene (CTFE), copolymers and terpolymers of tetrafluoroethylene (TFE), terpolymers of tetrafluoroethylene, hexafluoropropylene and ethylene (THE), and terpolymers of tetrafluoroethylene, hexafluoropropylene and vinylidene fluoride (THV). In a preferred embodiment, the melt processable fluoropolymer used to prepare the first or inner layer of the secondary buffer member 16 is a thermoplastic fluoroelastomer. In a more preferred embodiment, the fluoropolymer is a terpolymer of tetrafluoroethylene, hexafluoropropylene and vinylidene fluoride, which is available from Dyneon LLC, 33rd Street North, Oakdale Minn. 55128, under the trade designation DYNEON THV (Grade 200G or 500G) thermoplastic fluoropolymer elastomers. It is noted that the elastomeric characteristics of this more preferred fluoropolymer have been shown to favorably affect the dimensional stability (and thus the optical attenuation) of the fiber optic cable 10 of the present invention. It is further noted that the use of a fluoroelastomer as the inner layer of the secondary buffer member 16 obviates the need for silicone buffers, which have a tendency to contaminate the optical fiber.

The bondable polyimide second or outer layer of the secondary buffer member 16 preferably takes the form of a heat or pressure sealed, low-shrinkage polyimide film that is held loosely around the inner layer of member 16. In addition to demonstrating low axial shrinkage, the polyimide film maintains high bond strength between heat or pressure sealed, overlapping film regions even at high temperatures (i.e., greater than or equal to 200° C.), thus serving to increase the dimensional stability of secondary buffer member 16.

Any film-forming polyimide may be used in the practice of the present invention, with preferred polyimides being aromatic polyimide films. In a more preferred embodiment, the polyimide film is a polyimide copolymer film derived from the reaction of an aromatic tetracarboxylic acid dianhydride component comprising from 0 to 95 mole %, preferably from 10 to 95 mole %, of 3,3',4,4'-biphenyltetracarboxylic dianhydride and from 5 to 100 mole %, preferably from 5 to 90 mole %, of pyromellitic dianhydride, and an aromatic diamine component comprising from 25 to 99 mole %, preferably from 40 to 98 mole %, of p-phenylene diamine and from 1 to 75 mole %, preferably from 2 to 60 mole %, of a diaminodiphenyl ether such as 4,4'-diaminodiphenyl ether, 3,3'-diaminodiphenyl ether or 3,4'-diaminodiphenyl ether. Such films are described in U.S. Pat. No. 5,731,088 to Philip R. La Court, which is incorporated herein by reference.

The polyimide films used in the second or outer layer of member 16 are films having a sealable component (i.e., a heat-sealable or pressure sensitive adhesive) coated or laminated on/to one surface. It is noted that such films are typically purchased with at least one surface coated with a heat-sealable adhesive, where the coating or lamination of such films constitutes a highly specialized area of practice undertaken by only a limited number of companies.

Heat-sealable adhesives, which may be used in the present invention, include perfluoropolymer, crosslinkable fluoropolymer, and polyimide adhesives. As will be readily appreciated, when fluoropolymer heat-sealable adhesives are employed, these adhesives would be coated or laminated on/to only the inner surface of the polyimide film so as not to interfere with the bonding of the outer surface of the film to e.g. ceramic ferrules.

Perfluoropolymer adhesives, appropriate for use in the present invention, include PTFE, FEP, PFA, and copolymers of tetrafluoroethylene and perfluoromethylvinylether (MFA) adhesives, while suitable crosslinkable fluoropolymer adhesives include ETFE and chlorotrifluoroethylene (CTFE) copolymer and terpolymer adhesives which contain minor amounts of one or more fluorinated comonomers (e.g., HFP, HFIB, PFBE, VDF and VF), or one or more grafted comonomers such as maleic anhydride.

Polyimide adhesives, suitable for use in the present invention, include thermoplastic polyimide adhesives, which soften and become fluid at or above 200° C.

Preferred heat-sealable films are polyimide films coated or laminated on one side with a heat-sealable fluoropolymer adhesive. Such materials are available from DuPont, under the trade designations KAPTON 150FN019 and KAPTON 200FN011 heat-sealable composite films. Most preferred heat-sealable films are polyimide films coated or laminated with a heat-sealable polyimide adhesive. Such materials are also available from DuPont, under the trade designations KAPTON HKJ, KAPTON EKJ, and KAPTON ELJ heat-sealable polyimide films.

The heat or pressure sealable polyimide films are preferably applied to the first or inner layer of the secondary buffer member 16 in tape form, by either spirally or axially wrapping the tape about the first or inner layer.

For spiral-wrap applications, the tape preferably has a width ranging from about 0.3 to about 1 centimeter (cm), and a thickness ranging from about 0.01 to about 0.04 millimeters (mm). The tape is preferably wrapped so as to achieve a degree of overlap ranging from about 15 to about 70%.

In regard to axial-wrap applications, the tape preferably has a width ranging from about 0.5 to about 1 cm, and a thickness ranging from about 0.01 to about 0.04 mm. For much larger cable applications, such as multiplex cable applications, the tape preferably has a width of from about 110 to about 150% of the cable circumference, and a thickness ranging from about 0.01 to about 0.04 mm. The polyimide tape is preferably wrapped so as to achieve a degree of overlap ranging from about 10 to about 30%.

After a heat-sealable tape is applied to the first or inner layer of the secondary buffer member 16, the resulting assembly may be heated (in a separate heating step) to a temperature ranging from about 240° C. to about 350° C., preferably from about 300° C. to about 320° C. The purpose of the heating operation is to bond or fuse the overlapping regions of the tape, thereby forming an effective seal against moisture along the length of the second or outer layer. As will be readily apparent to those skilled in the art, such a separate heating step may be unnecessary if the assembly will be exposed to such temperatures during the extrusion of outer layer 20.

Bond strength between a fiber optic cable and an optical connector is measured in accordance with Method Number 2009-1 (the "Termini Retention Test") of The Society of Automotive Engineers (SAE) Test Standard SAE-AS-13441 (entitled "Test Methods for Electrical Connectors"), dated January 1998. When tested in accordance with this test method, a preferred embodiment of the fiber optic cable assembly of the present invention, which basically comprises a fiber optic cable having a secondary buffer member with a bondable fluoropolymer outer surface or layer, a connector adapted to receive the cable, and an adhesive for bonding the fluoropolymer outer surface or layer to the connector, demonstrates a bond strength of at least 2 Newtons per centimeter (N/cm) (coating width) in the adhesive coated area(s) thereof. In a more preferred embodiment, the bond strength ranges from about 2 N/cm to about 9 N/cm, and in yet a more preferred embodiment, the bond strength ranges from about 3 N/cm to about 5 N/cm. Different bond strengths may be achieved on other substrates.

Secondary buffer member 16 preferably has a wall thickness ranging from about 360 µm to about 390 µm and an outer diameter ranging from about 850 µm to about 900 µm.

Strength member 18 serves to bear most of the force imparted to fiber optic cable 10 by e.g. pulling and other mechanical strains. Strength member 18 also exhibits low axial shrinkage and in a preferred embodiment is prepared from reinforcing materials loosely braided, woven or wound, about the exterior of the secondary buffer member 16. Materials suitable for use in this layer include metal (e.g., carbon, carbon steel, copper, brass, stainless steel and alloys thereof) and non-metal (e.g., aramid, glass, polyester, and polyimide) reinforcing materials.

In one preferred embodiment, strength member 18 is prepared using either polyimide films or glass fiber-reinforced low smoke composites.

In another preferred embodiment, strength member 18 is prepared using aramid yarns or fibers. Aramid yarns or fibers are sold by DuPont under the trade designations KEVLAR synthetic para-aramid fibers and NOMEX synthetic meta-aramid fibers, and by Teijin Shoji (USA), 42 W 39$^{th}$ St. Fl. 6, New York, N.Y. 10018-3809, USA, under the trade designation TECHNORA para-aramid fibers.

In a more preferred embodiment, strength member 18 is prepared using fully pre-baked KEVLAR 29 and/or KEVLAR 49 aramid yarns. These yarns are baked prior to use by passing the yarns (at speeds ranging from about 30 to about 40 feet per minute) through three-foot long ovens that have been heated to temperatures ranging from about 260° C. to about 315° C., to remove chemicals which have been added to the surface of these yarns by the manufacturer to aid in mechanical handling. The chemical surface treatment smokes heavily when heated and therefore is objectionable in aerospace fiber optic cable applications.

It is noted that partially pre-baking KEVLAR aramid yarns (i.e., pre-baking yarns by passing the yarns (at speeds ranging from about 30 to about 40 feet per minute) through a three-foot long oven heated to a temperature ranging from about 180° C. to about 200° C.) does not completely remove chemicals from the surface of these yarns, and fiber optic cables employing such partially pre-baked yarns do not pass the smoke emission requirements set forth in Boeing BSS 7324. It has been discovered that pre-baking of these yarns must be conducted at temperatures of at least about 260° C. to overcome this problem.

It is further noted that pre-baked KEVLAR yarns tend to fray, thereby greatly increasing the amount or degree of mechanical handling required to effectively weave or braid these materials onto the secondary buffer member 16. By way of the present invention, it has been further discovered that excessive mechanical handling can be avoided by spiral-wrapping the KEVLAR yarn onto the secondary buffer member 16. More specifically, strength member 18 may be prepared by spiral wrapping helically orientated KEVLAR yarns so as to axially extend and circumferentially surround secondary buffer member 16.

Strength member 18 preferably has a wall thickness ranging from about 350 µm to about 400 µm and an outer diameter ranging from about 1600 µm to about 1700 µm.

The outer protective jacket 20 of the fiber optic cable 10 of the present invention, which is held loosely around strength member 18, also exhibits low axial shrinkage. Outer jacket 20 serves to protect fiber optic cable 10 from the environment while aiding in the dimensional stability of the cable.

Outer jacket 20 is preferably prepared using a fluoropolymer material. Fluoropolymers which may advantageously be utilized in layer 20 include, for example, copolymers of CTFE and vinylidene fluoride, ETFE copolymers, ethylene-chlorotrifluoroethylene (ECTFE) copolymers, fluorinated ethylene-propylene (FEP), perfluoroalkoxy (PFA), polytetrafluoroethylene (PTFE), polytetrafluoroethylene-perfluoromethylvinylether (MFA), polyvinylfluoride (PVF) resins, polyvinylidene fluoride (PVDF), tetrafluoroethylene-hexafluoropropylene-vinylidene fluoride (THV), and mixtures thereof.

In a more preferred embodiment, the fluoropolymer of outer jacket 20 is a somewhat elastomeric fluoropolymer selected from the group of FEP, smoke-suppressed THV and smoke-suppressed copolymers of CTFE and vinylidene fluoride. In yet a more preferred embodiment, the fluoropolymer is a smoke-suppressed copolymer of CTFE and vinylidene fluoride.

The term "smoke-suppressed", as used herein, is intended to mean fluoropolymers that contain (as extruded) from about 15 to about 40% by weight of a smoke-suppressing agent. Suitable smoke-suppressing agents include aluminum trihydrate, zinc borate, clay, magnesium carbonate, metal hydroxides (e.g., aluminum hydroxide, magnesium hydroxide), talc, and mixtures thereof. In a more preferred embodiment, the smoke-suppressing agent is magnesium hydroxide, which is available from Kyowa Chemical Industry Co., Ltd., Sakaide, Kagawa 762-0012, Japan, under the product designation KISUMA 5, or zinc borate, which is available from U.S. Borax Inc., 26877 Tourney Road, Valencia, Calif. 91355, under the product designation FIREBRAKE ZB fire retardant material.

It is noted that the elastomeric characteristics of the preferred fluoropolymers noted above help pistoning (i.e., the axial movement of an optical fiber within a cable jacket). More specifically, the buffered optical fiber or core needs to move axially inside the cable jacket to maintain good contact under situations where vibrations occur, such as vehicular applications. Elastomeric jacket 20 helps to push the core back to its initial position thereby maintaining good contact inside the connector.

The fluoropolymer(s) used to prepare outer protective jacket 20 preferably contains a photosensitive substance (e.g., titanium dioxide), which renders jacket 20 receptive to laser marking. The term "laser marking," as used herein, is intended to mean a method of marking a fiber optic cable using an intense source of ultraviolet or visible radiation, preferably a laser source. In accordance with this method, exposure of the outer protective jacket 20 to such intense radiation will result in a darkening where the radiation was incident. By controlling the pattern of incidence, marks such as letters and numbers can be formed. In a more preferred embodiment, the fluoropolymer(s) contains (as extruded) from about 1 to about 4% by weight, of titanium dioxide.

In addition to the above component, the fluoropolymer(s) may advantageously contain other additives such as acid scavengers (e.g., calcium carbonate), antioxidants, crosslinking agents (e.g., triallyl isocyanurate (TAIC), triallylcyanurate (TAC) and trimethallylisocyanurate (TMAIC)), dyes or colorants (e.g., cobalt phosphate), fibers, lubricants (e.g., PTFE powder), mineral fibers, pigments (e.g., titanium oxide), plasticizers, stabilizers, and the like. However, some such additives may have an adverse effect on the desirable properties of the fiber optic cable 10 of the present invention.

Outer protective jacket 20 may be formed by either extruding a fluoropolymer material along a portion or length of strength member 18, or by wrapping a fluoropolymer film, in an overlapping fashion, along a portion or length of member 18. In a preferred embodiment, outer jacket 20 is formed by melt-kneading and extruding a fluoropolymer material onto member 18 using a twin-screw extruder.

Fiber optic cable 10 may be subjected to a so-called "skin irradiation" process to effect crosslinking in the outer protective jacket 20. The subject process employs ionizing radiation in the form of accelerated electrons, and basically comprises using an accelerated voltage such that the maximum attained distance of accelerated charged particles is less than or equal to the thickness of the outer jacket 20. More specifically, with an applied voltage of 120 KV, most electrons will penetrate outer jacket 20 to a maximum depth of approximately 0.20 mm.

The present inventors have found that such a "skin irradiation" process will not serve to damage the optical fiber(s) 12 or the primary buffer member 14.

Such a technique or process is briefly described in JP 4-52570 in regard to automotive low voltage wire coated with e.g. a soft vinyl chloride resin. JP 4-52570 is incorporated herein by reference.

Outer protective jacket 20 preferably has a wall thickness ranging from about 150 μm to about 200 μm, and an outer diameter ranging from about 1.8 mm to about 2.0 mm.

Figure 2:
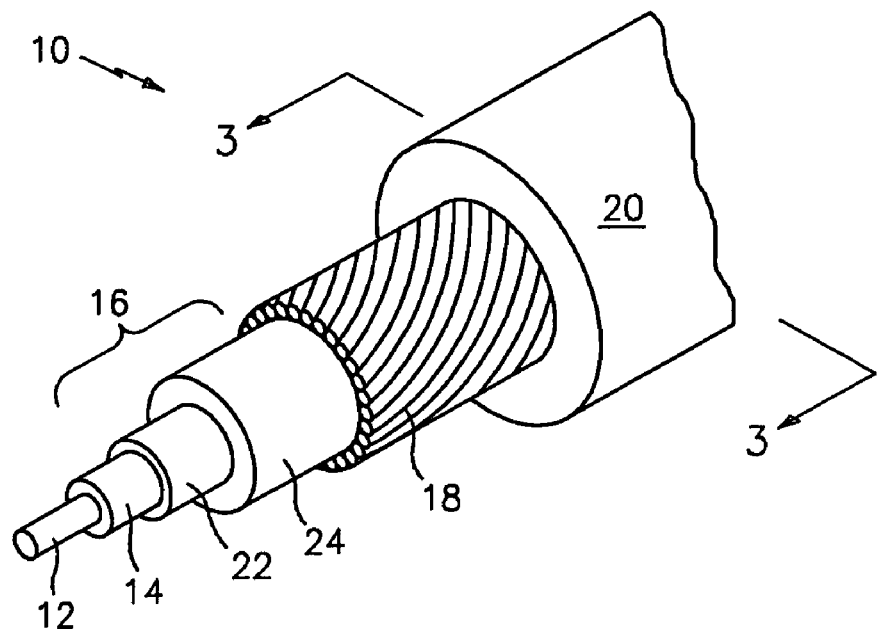
FIG. 2 is a partial side perspective view of a preferred embodiment of the fiber optic cable of the present invention.
Figure 3:
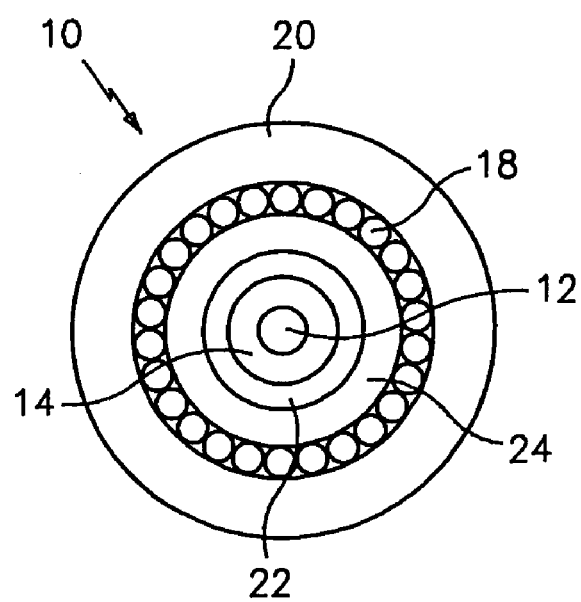
FIG. 3 is an enlarged cross-sectional view of the preferred fiber optic cable shown in FIG. 2, taken along lines 3—3.

In a most preferred embodiment of the present invention, and as best shown in FIGS. 2 and 3, fiber optic cable 10 comprises:
(1) at least one optical fiber 12;
(2) a primary buffer member 14 comprising an acrylate coating circumferentially surrounding each optical fiber 12;
(3) a dual layer secondary buffer member 16 comprising an extruded THV copolymer inner layer 22, and an extruded maleic anhydride grafted ETFE copolymer outer layer 24;
(4) a strength member 18 comprising spiral wrapped, helically orientated KEVLAR yarns or fibers that axially extend and circumferentially surround the outer layer 24 of the secondary buffer member 16; and
(5) a low smoke outer protective jacket 20 comprising a smoke-suppressed copolymer of CTFE and vinylidene fluoride.

A preferred process for preparing fiber optic cable 10 comprises:
(1) forming a primary buffer member 14 on at least one optical fiber 12;
(2) forming a dual layer secondary buffer member 16 on the primary buffer member 14 by extruding a suitable first fluoropolymer onto the primary buffer member 14 and then by extruding a bondable fluoropolymer onto an outer surface of the first fluoropolymer;
(3) forming a strength member 18 by spiral wrapping fully pre-baked KEVLAR yarns or fibers on an outer surface of the bondable fluoropolymer of the dual layer secondary buffer member 16; and
(4) forming a low smoke outer protective jacket 20 on the strength member 18 by extruding a suitable fluoropolymer onto an outer surface of the strength member 18, and optionally crosslinking the fluoropolymer.

The preferred process may further comprise the step of subjecting the fiber optic cable 10 to thermal treatments to eliminate or further reduce shrinkage in the secondary buffer member 16 and in the outer protective jacket 20.

Figure 4:
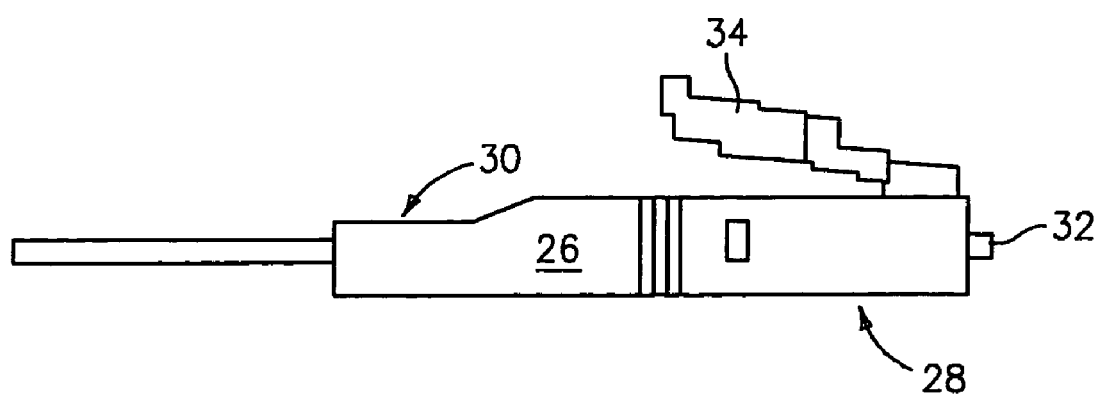
FIG. 4 is a side plan view of an LC connector.
Figure 5:
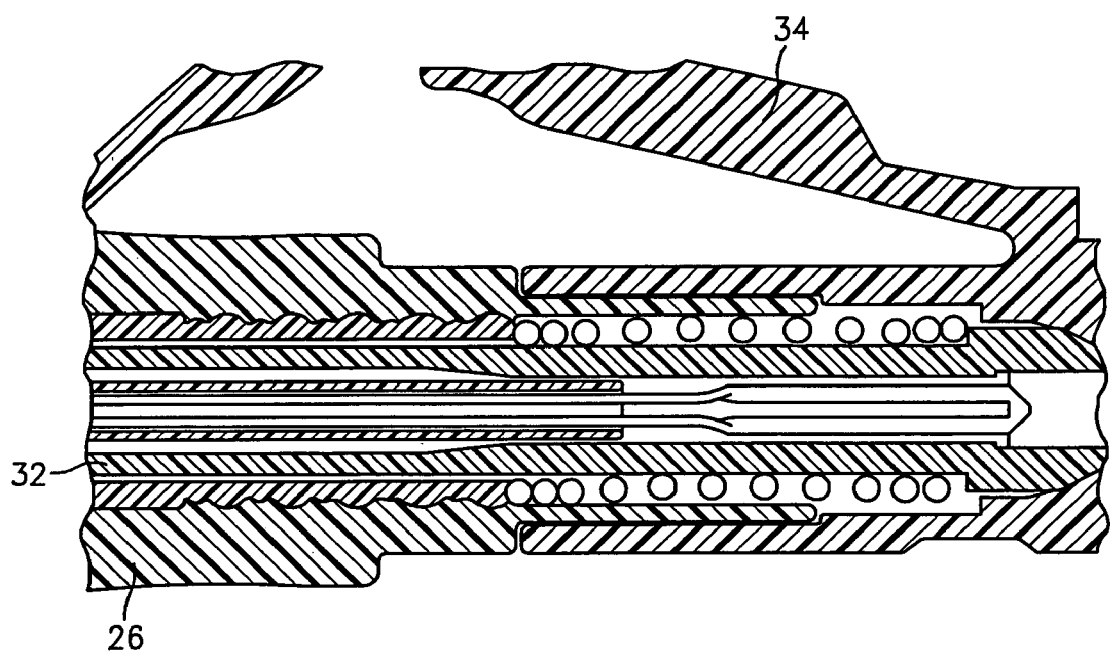
FIG. 5 is a cross-section of an integrated fiber optic cable/ferrule assembly inside the generally cylindrical housing of an LC connector.

As noted above, the inventive cable 10 facilitates bonding to optical connectors, such as LC connectors. As best shown in FIGS. 4 and 5, LC connectors basically comprise a generally cylindrical connector housing 26 having front and rear portions 28, 30, and a plug ferrule 32, which is slidably mounted within the connector housing 26. LC connectors use a cantilever latch 34 during interconnection with a mating receptacle or adaptor (not shown) in a manner similar to the modular plugs and jacks used in conventional telephone equipment. In order to mate with the receptacle or adaptor, the LC connector is mounted upon an end portion of a fiber optic cable. More specifically, a stripped end of the cable is inserted into the ferrule 32 such that mating of the ferrule 32 and the receptacle or adaptor will align or connect the optical fibers of the fiber optic cable with respective optical fibers within the receptacle or adaptor.

In preparation for connecting inventive fiber optic cable 10 to an LC connector, a locking device (e.g., a crimp ferrule or ring) is positioned on an outer surface of one end of cable 10, and the cable stripped at that end to expose a predetermined length of the secondary buffer member 16. An adaptor is then employed to radially flare the strength member 18, thereby maintaining uniform distribution of the strands of the strength member 18, which enhances the cable retention ability after crimping. A bonding adhesive is then injected into the ferrule 32 of connector housing 26, with suitable bonding adhesives being thermosetting epoxy adhesives having a $T_g$ of greater than about 85° C. In a preferred embodiment, the bonding adhesive is a thermosetting epoxy adhesive available from Epoxy Technology, Inc., 14 Fortune Drive, Billerica, Mass. 01821, under the product designation EPO-TEK 353ND high temperature epoxy. These bonding adhesives are provided as two separated components, namely—an epoxy resin and an amine curing agent, that are mixed prior to using. The components are mixed in a ratio ranging from about 9 to about 1 part by weight of the epoxy resin to from about 11 to about 1 part by weight of the amine curing agent, at room temperature. In a preferred embodiment, the components are mixed in a ratio of from about 10 parts by weight of the epoxy resin to from about 1 part by weight of the amine curing agent. The stripped end of cable 10 is then inserted into the connector housing 26 such that the buffered optical fiber passes through the adhesive coated bore of ferrule 32. The bonding adhesive is then preferably exposed to a low dwell temperature for a period of time sufficient to set or stabilize the adhesive. Next, a drop of bonding adhesive is added to an outer surface of the rear portion 30 of the connector housing 26. The locking device is then positioned over rear portion 30 and mechanically attached to the connector housing 26 by applying sufficient force to deform the collar around rear portion 30 and to effect a seal between the inside surface of the crimp collar and the exposed surface of the rear portion 30 of housing 26. The set or stabilized bonding adhesive is then preferably exposed to a multi-stage cure cycle or stepped-cure to fully cure or cross-link the bonding adhesive. More specifically, the bonding adhesive is preferably cured by exposing the assembly to the following cure cycle: 90° C. for 20 minutes, 100° C. for 5 minutes, 120° C. for 2 minutes. The assembly may then be cleaned and polished.

As noted above, the fiber optic cable assembly of the present invention exhibits a bond strength of at least about 2 N/cm in the adhesive coated area(s) thereof.

The fiber optic cable 10 of the present invention, in preferred embodiments thereof, satisfies aerospace industry standards for smoke emission and toxicity. More specifically, these preferred embodiments meet or exceed the requirements of Boeing BSS-7324.

Smoke emission is measured by specific optical smoke density ($D_s$) in both the flaming and non-flaming modes by means of National Bureau of Standards (NBS) smoke chambers which are designed to meet ASTM E662 test requirements. The maximum optical density as a function of light obscuration is observed with a vertical light path. The low smoke fiber optic cable 10 of the present invention, when tested in accordance with Boeing BSS-7324, produces a smoke, when in the flaming mode for four minutes, with a specific optical density of less than 100, preferably less than 80, and more preferably less than 50. It is noted that Boeing currently requires a maximum specific optical smoke density of less than 50 (based on four-minute samples), as determined under Boeing BSS-7324.

As shown below in Table 1, three more preferred embodiments of the present inventive cable 10, when tested by means of the NBS smoke chamber and in accordance with Boeing BSS-7324 test requirements, achieved a specific optical smoke density of less than 50 at four minutes in the flaming mode.

TABLE 1

Summary of Examples 1 to 4

| Cable Construction | EXAMPLES | | | |
|---|---|---|---|---|
| | 1 | 2 | 3 | 4 |
| Optical Fiber Coated with Primary Buffer | | | | |
| 62.5/125 µm graded-index, multi-mode acrylate buffered optical fiber[1] | √ | √ | √ | √ |
| Dual Layer Secondary Buffer | | | | |
| Inner Layer Extruded THV[2] | √ | √ | √ | √ |
| Outer Layer Extruded modified ETFE[3] | √ | √ | √ | √ |
| Strength Member | | | | |
| Fully pre-baked aramid yarns or fibers[4] | √ | √ | √ | √ |
| Outer Jacket | | | | |
| Extruded and smoke-suppressed THV[5] | √ | | | |
| Extruded FEP[6] | | √ | | |
| Extruded and Smoke-suppressed PVDF | | | √[7] | √[8] |
| Smoke Density @ 4 Minute Point/ Flaming Mode[9] | 39.41 | 31.61 | 26.3 | 78.6 |

[1]CORNING 62.5/125 COAT CPC6 optical fibers.
[2]DYNEON THV G500 thermoplastic fluoropolymer elastomer.
[3]TEFZEL 2202 synthetic resinous fluorine-containing polymers.
[4]KEVLAR 49 aramid yarns, which have been fully pre-baked by passing the yarns (at a speed of thirty feet per minute) through a three-foot long oven heated to a temperature of 300° C.
[5]DYNEON THV G500 thermoplastic fluoropolymer elastomer, which has been compounded with 25 parts by weight of magnesium hydroxide, 4 parts by weight of cobalt phosphate, and 2 parts by weight of titanium oxide, per 100 parts by weight of elastomer.
[6]TEFLON FEP 100 fluorinated ethylene-propylene copolymer.
[7]SOLEF PVDF Copolymer 32008-0009 fluoropolymer (smoke-suppressed grade).
[8]SOLEF PVDF Copolymer 32008-0009 fluoropolymer (smoke-suppressed grade), which has been compounded with 4% by weight of cobalt phosphate, 2% by weight of titanium oxide, and 2% by weight of calcium carbonate, based on the total weight of the fluoropolymer.
[9]BSS-7324 Smoke Emission Test Method, 4-minute burn, flaming mode (each reported value is the average of three tests).

As shown in Table 1, Examples 1 to 3, which each employed a different outer jacket material, satisfied the Boeing BSS-7324 four-minute smoke density in flaming-mode requirement. Example 4, which employed a smoke-suppressed PVDF outer jacket material, which had been compounded with cobalt phosphate, titanium oxide and calcium carbonate, exhibited a higher smoke density.

In a preferred embodiment, cable 10 also demonstrates improved dimensional stability and has more stable signal carrying characteristics under severe conditions. In other words, the inventive cable 10 minimizes or removes stress when cable 10 is bent or heat cycles on use.

Preliminary testing of this preferred embodiment has confirmed, as set forth in Table 2 below, that this fiber optic cable demonstrates improved dimensional stability in the form of reduced jacket shrinkage and thus reduced optical attenuation in the cable, when compared to a prior art cable comprising a 62.5/125/400 µm silicone buffered silica/silica optical fiber, a "high-halogen" copolymer primary jacket layer, an aromatic fiber braid mechanical strength layer, and a "high-halogen" copolymer and ETFE outer jacket.

Dimensional stability was measured by first exposing each fiber optic cable to a temperature cycling regimen (i.e., temperatures ranging from about −65° C. to about 180° C. for polyimide buffered fibers, temperatures ranging from about −65° C. to about 135° C. for acrylate buffered fibers) using a dynamic mechanical analyzer (DMA) with zero load and measuring jacket shrinkage in accordance with the test procedures detailed in Boeing Standard BMS 13-71 entitled "Draft BMS 13-71 Cable, Fiber Optic" dated Mar. 23, 2002 ("Boeing BMS 13-71"), and in Judd Wire, Inc.'s Standard Operating Procedure (SOP) Number 90111, entitled "Shrinkage Measurement Method", publication date—Oct. 29, 2003 ("Judd SOP 90111"), and then by measuring the stability of optical attenuation in each cable in accordance with the test procedure detailed in Electronic Industries Association (EIA)/Telecommunications Industry Association (TIA) Test Procedure Number 455-3A, dated May 23, 1989 ("EIA/TIA Test Procedure Number 455-3A"), said test procedures being incorporated herein by reference. The results are shown in Table 2, below.

TABLE 2

Summary of Example 5 and Comparative Example C-1

| | | Dimensional Stability | | |
|---|---|---|---|---|
| | | | Attenuation[7] (dB/km) | |
| | | Jacket | | |
| Example | Cable Construction | Shrinkage[6] (%) | 850 nm | 1300 nm |
| 5 | Optical Fiber Coated with Primary Buffer 62.5/125 µm graded-index, multi-mode acrylate buffered optical fiber[1] Dual Layer Secondary Buffer Inner Layer Extruded THV[2] Outer Layer Extruded modified ETFE[3] Strength Member Fully pre-baked aramid yarns or fibers[4] Outer Jacket Extruded and smoke-suppressed PVDF[5] | 0.35 | 2.8 | 0.6 |

TABLE 2-continued

Summary of Example 5 and Comparative Example C-1

| Example | Cable Construction | Dimensional Stability Jacket Shrinkage[6] (%) | Attenuation[7] (dB/km) 850 nm | Attenuation[7] (dB/km) 1300 nm |
|---|---|---|---|---|
| C-1 | FILOTEX ET 132126 fiber optic cable | — | 4.0 | 2.0 |

[1]CORNING 62.5/125 COAT CPC6 optical fibers.
[2]DYNEON THV G500 thermoplastic fluoropolymer elastomer.
[3]TEFZEL 2202 synthetic resinous fluorine-containing polymers.
[4]KEVLAR 49 aramid yarns, which have been fully pre-baked by passing the yarns (at a speed of thirty feet per minute) through a three-foot long oven heated to a temperature of 300° C.
[5]SOLEF PVDF Copolymer 32008-0009 fluoropolymer (smoke-suppressed grade), which has been compounded with 4% by weight of cobalt phosphate, 2% by weight of titanium oxide, and 2% by weight of calcium carbonate, based on the total weight of the fluoropolymer.
[6]Judd SOP 90111.
[7]EIA/TIA Test Procedure Number 455-3A.

The results shown in Table 2, demonstrate that when the optical fiber is a 62.5/125 μm graded-index, multi-mode optical fiber, the inventive fiber optic cable demonstrates an optical attenuation of about 2.8 dB/km at 850 nm and of about 0.6 dB/km at 1300 nm, which is dramatically less than the optical attenuations demonstrated by Comparative Example C-1.

More preferred optical attenuations for the inventive fiber optic cables employing one or more 62.5/125 μm graded-index, multi-mode optical fibers, will be less than about 3.5 dB/km at 850 nm (most preferably, less than about 3.0 dB/km at 850 nm) and less than about 1.5 dB/km at 1300 nm (most preferably, less than about 1.0 dB/km at 1300 nm), while fiber optic cables employing one or more 9/125 μm single-mode optical fibers, will demonstrate an optical attenuation of less than about 3.0 dB/km at 850 nm (most preferably, less than about 2.8 dB/km at 850 nm) and less than about 1.0 dB/km at 1300 nm (most preferably, less than about 0.8 dB/km at 1300 nm), when tested in accordance with EIA/TIA Test Procedure Number 455-3A.

While various embodiments of the present invention have been described above, it should be understood that they have been presented by way of example only, and not limitation. Thus, the breadth and scope of the present invention should not be limited by any of the exemplary embodiments.

The invention claimed is:

1. A low smoke, low toxicity fiber optic cable that comprises:
   (1) at least one optical fiber;
   (2) a primary buffer member circumferentially surrounding each optical fiber, wherein the primary buffer member is prepared from a material selected from the group of silicones, acrylic polymers, acrylates and polyimides;
   (3) a secondary buffer member circumferentially surrounding the primary buffer member, wherein the secondary buffer member is prepared from, or has an outer surface or layer prepared from, a material selected from the group of bondable polyimides and grafted or modified fluoropolymers;
   (4) a strength member circumferentially surrounding the secondary buffer member; and
   (5) an outer protective jacket circumferentially surrounding the strength member,
   wherein, when tested in accordance with Boeing Specification Support Standard BSS 7324 (Dec. 2, 1998) Smoke Emission Test Method, the cable produces, at four minutes in the flaming mode, a smoke with a specific optical density of less than 100.

2. The fiber optic cable of claim 1, wherein when tested in accordance with Boeing Specification Support Standard BSS 7324 (Dec. 2,1998) Smoke Emission Test Method, the cable produces, at four minutes in the flaming mode, a smoke with a specific optical density of less than about 80.

3. The fiber optic cable of claim 2, wherein when tested in accordance with Boeing Specification Support Standard BSS 7324 (Dec. 2, 1998) Smoke Emission Test Method, the cable produces, at four minutes in the flaming mode, a smoke with a specific optical density of less than about 50.

4. The fiber optic cable of claim 1, wherein the primary buffer member is prepared from a material selected from the group of acrylate functional monomers, acrylate functional oligomers, and mixtures thereof.

5. The fiber optic cable of claim 1, wherein the primary buffer member is prepared from a polyimide material.

6. The fiber optic cable of claim 1, wherein the secondary buffer member is made up of a single layer that is prepared from a grafted or modified fluoropolymer comprising a maleic anhydride grafted ethylene-tetrafluoroethylene copolymer.

7. The fiber optic cable of claim 1, wherein the secondary buffer member is made up of two layers, wherein a first or inner layer is prepared from one or more fluoropolymers that can be melt-processed at temperatures of less than about 200° C. and wherein a second or outer layer is prepared from a material selected from the group of bondable polyimides and grafted or modified fluoropolymers.

8. The fiber optic cable of claim 7, wherein the first or inner layer is prepared from a thermoplastic fluoroelastomer.

9. The fiber optic cable of claim 8, wherein the thermoplastic fluoroelastomer is a terpolymer of tetrafluoroethylene, hexafluoropropylene and vinylidene fluoride.

10. The fiber optic cable of claim 7, wherein the second or outer layer is prepared from a bondable polyimide.

11. The fiber optic cable of claim 10, wherein the second or outer layer is prepared using a polyimide film having a sealable component coated on one surface thereof.

12. The fiber optic cable of claim 7, wherein the second or outer layer is prepared from a grafted or modified fluoropolymer.

13. The fiber optic cable of claim 12, wherein the grafted or modified fluoropolymer is a maleic anhydride grafted ethylene-tetrafluoroethylene copolymer.

14. The fiber optic cable of claim 1, wherein the strength member comprises aramid yarns or fibers that axially extend and circumferentially surround the secondary buffer member.

15. The fiber optic cable of claim 14, wherein the aramid yarns or fibers are yarns or fibers that have been fully pre-baked to remove chemicals added to the yarns or fibers during manufacture.

16. The fiber optic cable of claim 15, wherein the aramid yarns or fibers are pre-baked at temperatures of at least about 260° C. to remove the chemicals added during manufacture.

17. The fiber optic cable of claim 1, wherein the outer protective jacket is prepared using a fluoropolymer material selected from the group of fluorinated ethylene-propylene, smoke-suppressed tetrafluoroethylene-hexafluoropropylene-vi nylidene fluoride, and smoke-suppressed copolymers of chlorotrifluoroethylene and vinylidene fluoride.

18. The fiber optic cable of claim 1, wherein the primary buffered optical fiber(s) is a graded-index, multi-mode optical fiber(s) having a core diameter of approximately 62.5 micrometers and a cladding diameter of approximately 125 micrometers, and wherein the fiber optic cable demonstrates an optical attenuation (EIA/TIA Test Procedure Number 455-3A) of less than about 3.5 decibels per kilometer at 850 nanometers and less than about 1.5 decibels per kilometer at 1300 nanometers.

19. The fiber optic cable of claim 18, wherein the fiber optic cable demonstrates an optical attenuation (EIA/TIA Test Procedure Number 455-3A) of less than about 3.0 decibels per kilometer at 850 nanometers and less than about 1.0 decibel per kilometer at 1300 nanometers.

20. The fiber optic cable of claim 1, wherein the optical fiber(s) is a single-mode optical fiber(s) having a core diameter of approximately 9 micrometers and a cladding diameter of approximately 125 micrometers, and wherein the fiber optic cable demonstrates an optical attenuation (EIA/TIA Test Procedure Number 455-3A) of less than about 3.0 decibels per kilometer at 850 nanometers and less than about 1.0 decibel per kilometer at 1300 nanometers.

21. The fiber optic cable of claim 20, wherein the fiber optic cable demonstrates an optical attenuation (EIA/TIA Test Procedure Number 455-3A) of less than about 2.8 decibels per kilometer at 850 nanometers and less than about 0.8 decibels per kilometer at 1300 nanometers.

22. A low smoke, low toxicity fiber optic cable that comprises:
   (1) at least one optical fiber;
   (2) a primary buffer member circumferentially surrounding each optical fiber;
   (3) a secondary buffer member circumferentially surrounding the primary buffer member, wherein the secondary buffer member is prepared from, or has an outer surface or layer prepared from, a material selected from the group of bondable polyimides and maleic anhydride grafted ethylene-tetrafluoroethylene copolymers;
   (4) a strength member circumferentially surrounding the secondary buffer member; and
   (5) an outer protective jacket circumferentially surrounding the strength member,
   wherein, when tested in accordance with Boeing Specification Support Standard BSS 7324 (Dec. 2, 1998) Smoke Emission Test Method, the cable produces, at four minutes in the flaming mode, a smoke with a specific optical density of less than 100.

* * * * *